(12) United States Patent
Marlin et al.

(10) Patent No.: US 6,676,373 B2
(45) Date of Patent: Jan. 13, 2004

(54) ASSEMBLY FORMED BY AT LEAST ONE BLADE AND A BLADE-FIXING PLATFORM FOR A TURBOMACHINE, AND A METHOD OF MANUFACTURING IT

(75) Inventors: François Marlin, Villiers-Sous-Grez (FR); Cyrille Mathias, Livry-Gargan (FR); François Ribassin, Villabe (FR)

(73) Assignee: SNECMA Moteurs, Paris (FR)

( * ) Notice: Subject to any disclaimer, the term of this patent is extended or adjusted under 35 U.S.C. 154(b) by 80 days.

(21) Appl. No.: 09/993,684

(22) Filed: Nov. 27, 2001

(65) Prior Publication Data

US 2002/0064456 A1 May 30, 2002

(30) Foreign Application Priority Data

Nov. 28, 2000 (FR) .............................................. 00 15325

(51) Int. Cl.$^7$ ................................................. F01D 9/04

(52) U.S. Cl. .................... 415/191; 415/200; 415/210.1; 29/889.71; 416/229 A; 416/230

(58) Field of Search ................................ 415/191, 200, 415/208.1, 208.2, 210.1; 416/229 R, 229 A, 230, 234; 29/889.22, 889.71

(56) References Cited

U.S. PATENT DOCUMENTS

| | | | | |
|---|---|---|---|---|
| 3,027,138 A | * | 3/1962 | Howell et al. | 416/220 R |
| 3,731,360 A | * | 5/1973 | Stone, Jr. | 416/229 R |
| 4,786,347 A | * | 11/1988 | Angus | 416/230 X |
| 4,966,527 A | * | 10/1990 | Merz | 416/241 R |
| 5,292,231 A | | 3/1994 | Lauzeille | |
| 6,196,794 B1 | * | 3/2001 | Matsumoto | 415/191 |

FOREIGN PATENT DOCUMENTS

GB          1 375 327          11/1974

* cited by examiner

*Primary Examiner*—Edward K. Look
*Assistant Examiner*—Richard A. Edgar
(74) *Attorney, Agent, or Firm*—Oblon, Spivak, McClelland, Maier & Neustadt, P.C.

(57) ABSTRACT

A part is used that constitutes a platform web and that has a shape close to the shape of the platform with an inside face and an outside face that are opposite each other. Fiber reinforcement plies are draped on a blade core and at least some of these plies extend beyond an end of the blade that is to be connected to the platform so as to form ply extensions. The ply extensions are folded down against the inside and outside faces of the platform to form flaps securing the blade to the platform, and fiber reinforcement plies are draped around the platform web and over the flaps so as to form a platform box retaining the flaps.

35 Claims, 3 Drawing Sheets

ASSEMBLY FORMED BY AT LEAST ONE BLADE AND A BLADE-FIXING PLATFORM FOR A TURBOMACHINE, AND A METHOD OF MANUFACTURING IT

BACKGROUND OF THE INVENTION

The invention relates to an assembly formed by at least one blade and a blade-fixing platform, and also to a method of manufacturing such an assembly.

The field of application of the invention is that of turbomachines, and particularly but not exclusively, making stator assemblies for turbomachines.

In conventional manner, turbomachine stator blades are fixed to top and bottom casings via platforms to which the ends of the blades are connected.

A commonly-used technique for connecting a blade to a platform consists in inserting an end portion of the blade in a socket in the platform together with an adhesive. Such a connection using adhesive can be inadequate.

When blades are made of composite material comprising plies of fiber reinforcement draped on a blade core, it has been proposed that the connection with the platform can be improved by extending the reinforcing plies beyond the end of the blade that is connected to the platform and by integrating the ply extensions with the platform. The reinforcing ply extensions extend as far as the zones where the platform is fixed to a casing so that they are themselves locally clamped between the casing and the elements for fixing the platform thereto.

OBJECT AND SUMMARY OF THE INVENTION

The invention seeks to further improve the structural connection between a blade and a platform.

This object is achieved by a method in which the blade is made by draping fiber reinforcement plies on a blade core, with at least a fraction of the plies extending beyond an end of the blade for connection to the platform so as to form ply extensions, and in which the ply extensions are folded down onto the platform to form flaps that provide a structural connection between the blade and the platform, in which method, according to the invention, a part is used that constitutes a platform web, having a shape that is close to the shape of the platform with an inside face and an outside face that are opposite each other, the ply extensions are folded down against the inside face and against the outside face of the web of the platform so as to form flaps for securing the blade to the platform, and fiber reinforcement plies are draped around the web of the platform and over the flaps so as to form a platform box holding the flaps captive.

The method of the invention is remarkable in that it makes it possible to achieve a particularly strong socketed structural connection between the blade and the platform because of the presence of flaps which overlie both sides of the web of the platform and which are themselves held captive by plies which are draped around the web of the platform.

Advantageously, a fraction of the ply extensions and the end of the blade are engaged in a passage formed through the web of the platform and having a section of shape that corresponds to the end profile of the blade, these ply extensions and the blade end being engaged in the passage from the inside face of the platform web, and the ply extensions that have passed through the platform web being folded down against the outside face thereof, while other ply extensions that have not been inserted in the passage are folded down against the inside face of the platform.

Also advantageously, the plies draped around the core of the blade and the plies draped around the web of the platform are impregnated with a resin, and heat treatment is performed simultaneously on all of the impregnated plies while they are held in shape. It is possible to perform draping using pre-impregnated plies or to drape plies that are dry and subsequently impregnated by injecting resin in a mold using a conventional resin transfer molding (RTM) technique. As a result, a structural bond is obtained by simultaneous polymerization of the resin impregnating the plies draped around the core of the blade and of the resin impregnating the plies draped around the web of the preform.

The invention also provides an assembly comprising at least one blade of composite material and an assembly platform for the blade, as can be obtained by the above method.

BRIEF DESCRIPTION OF THE DRAWINGS

The invention will be better understood on reading the following description given by way of non-limiting indication and with reference to the accompanying drawings, in which.

DETAILED DESCRIPTION OF EMBODIMENTS

Figure 1:
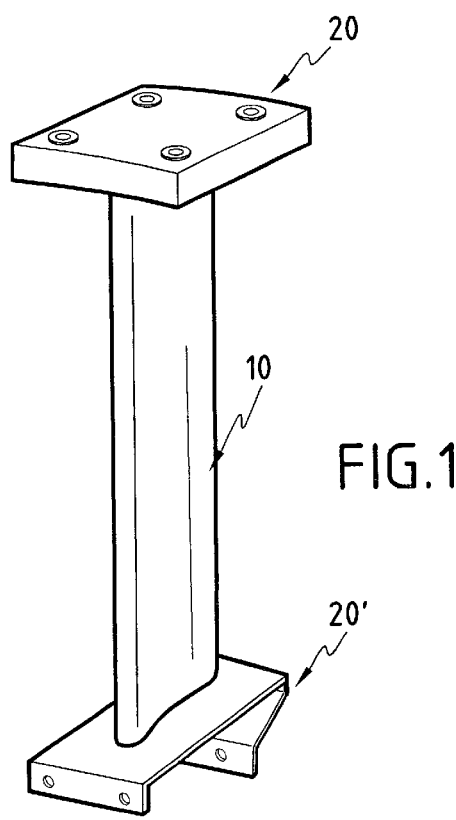
FIG. 1 is a fragmentary perspective view showing a blade-and-platform assembly for a turbomachine stator.
Figure 2:
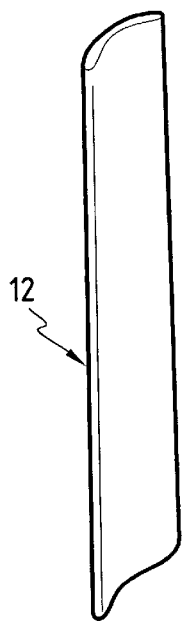
FIG. 2 is a diagrammatic perspective view of a blade core.
Figure 3:
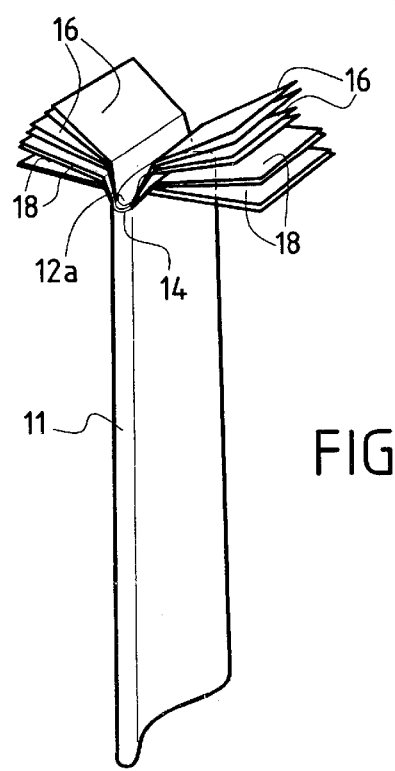
FIG. 3 is a diagrammatic view showing fiber reinforcing plies draped on the FIG. 2 blade core.

FIG. 1 shows a blade-and-platform assembly for a turbomachine stator suitable for being made in accordance with the invention.

The invention is not limited to this application.

In FIG. 1, the blade 10 is connected at one end to a top platform 20 and at its other end to a bottom platform 20'. The top platform is for fixing to a top (or outer) casing, not shown, while the bottom platform is for fixing to a bottom (or inner) casing, not shown, in well-known manner.

The connection between the blade and the top platform 20 is described below with reference to FIGS. 2 to 7, it being understood that a connection of the same type could be envisaged between the blade and the bottom platform.

The blade is made of composite material by draping plies of fiber reinforcement around a blade core so as to form a composite blade shell.

The blade core 12 (FIG. 2) can be constituted by a single piece of rigid foam, e.g. polyurethane foam, having a profile of shape corresponding to that required of the blade to be made, but smaller in section.

Plies 14 of fiber reinforcement are draped around the core 12 (FIG. 3) to form the composite shell of the blade. By way of example, the plies 14 are two-dimensional sheets of carbon fibers, e.g. woven sheets.

The plies 14 are larger in size than the blade in the longitudinal direction thereof, projecting beyond the end 12a of the blade that is to be connected to the platform. The portions of the sheets which project beyond said end are cut to form flanges 16, 18 projecting from the main faces of the vane.

The platform is built up around a web 22 (FIG. 4) which can be constituted by a block of rigid foam, e.g. polyurethane foam. The general shape of the block 22 is approximately a rectangular parallelepiped with a through passage 24 between its inside face 22a and its outside face 22b. The section of the passage 24 corresponds to the section of the end profile of the blade that is to be connected to the platform.

Figure 5:
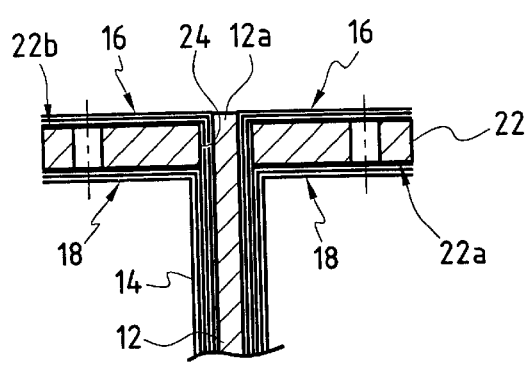
FIG. 5 is a diagrammatic section view on a larger scale showing a blade end socketed in the FIG. 4 platform web.
Figure 6:
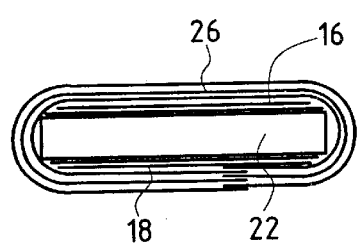
FIG. 6 is a fragmentary diagrammatic view, likewise on a larger scale, showing reinforcing fiber plies draped around the platform web.
Figure 7:
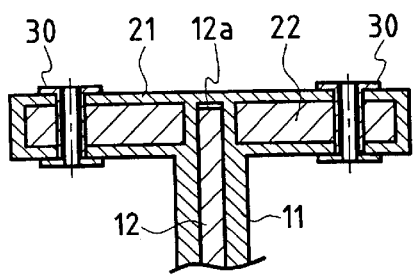
FIG. 7 is a section view of the platform after it has been assembled to the end of a blade.

To make the connection between the blade and the platform, the end 12a of the blade core and a fraction of the flanges or ply extensions are engaged through the passage 24 from the inside face 22a of the platform web (FIG. 5). The extensions 16 engaged through the passage 24 preferably form the first portion of the plies to be draped onto the blade core 12, e.g. part of the first half of the plies draped on the core 12. The remaining extensions 18 coming from the second portion of the plies to be draped onto the core 12 are not inserted through the passage 24.

When the end face 12a of the blade core has come level with the outside face 22b of the platform web, the extensions 16 are folded down onto said outside face 22b on either side of the passage 24, while the extensions 18 are folded onto the inside face 22a, likewise on either side of the passage 24.

Fiber reinforcement plies 26 having a cutout for passing the blade 10 are then draped around the web 22 of the platform over the folded-down flaps 16, 18 of the plies 14 (FIG. 6) so as to form a platform box. The plies 26 can be of the same kind as the plies 14 or they can be of a different kind.

The plies 14 and 26 are impregnated in resin. It is possible to use plies that are pre-impregnated prior to draping, or to use dry plies that are impregnated after being draped. The resins impregnating the plies 14 and the plies 26 are cured in a single heat treatment operation performed on all of the plies 14, 26. This provides a composite shell 11 for the blade and a composite box 21 for the platform (FIG. 7) while achieving the desired structural connection with the blade socketed in the platform and held by means of flaps 16, 18 that are held captive by the composite box surrounding the web of the platform.

Figure 4:
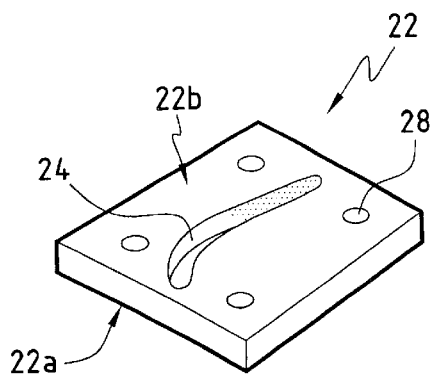
FIG. 4 is a diagrammatic perspective view of a platform web.
Figure 8:
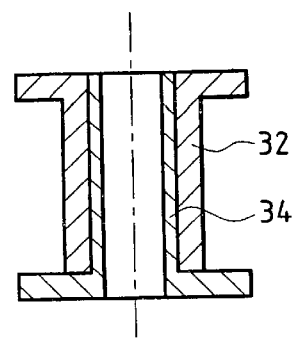
FIG. 8 is a section view of an insert for placing through a platform.

Inserts 30 that are preferably made out of metal, e.g. aluminum, are put into place through the platform, passing through its box and through passages 28 formed in the web 22 (FIG. 4). As shown in FIG. 8, the insert 30 comprises two tubular portions 32 and 34 receiving one in the other and presenting annular rims which are pressed against the inside and outside faces of the platform. The inserts 30 serve to pass fasteners for securing the platform to a casing.

It may be observed that the inserts can be put into place before the resin impregnating the plies 14, 26 is cured.

Figure 9:
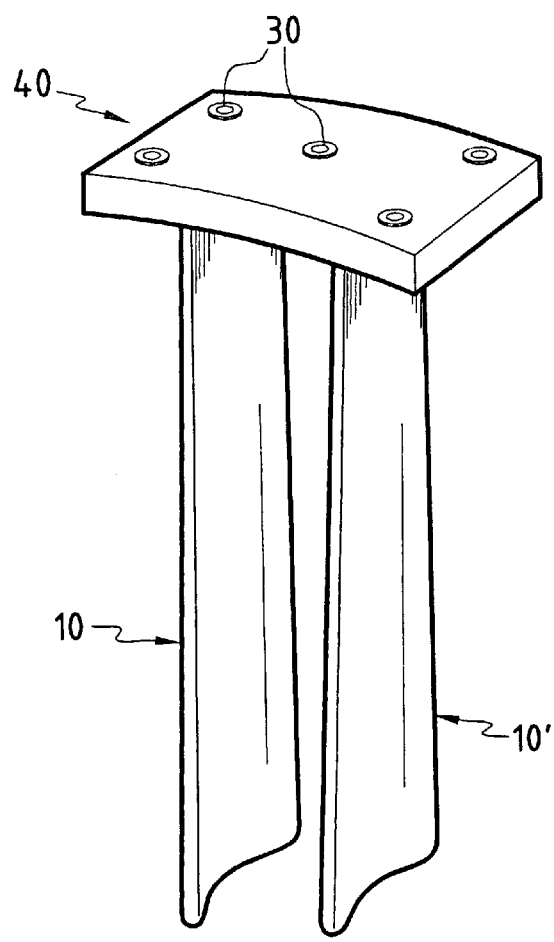
FIG. 9 is a diagrammatic perspective view showing an assembly comprising two blades connected to a common platform, for a turbomachine stator.

FIG. 9 shows an assembly comprising two blades 10, 10' connected to a common platform 40.

Figure 10:
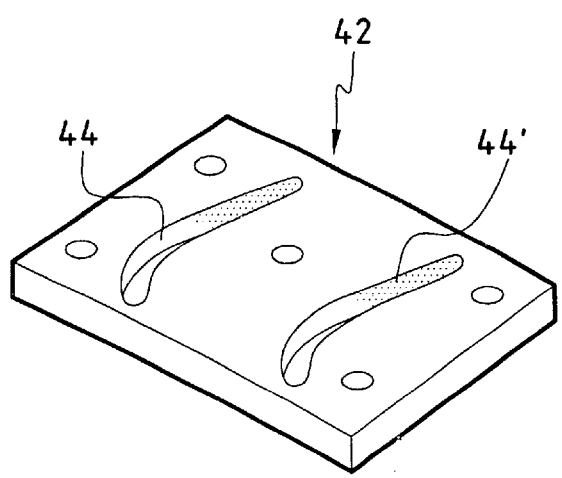
FIG. 10 is a diagrammatic perspective view of a platform web for the FIG. 9 assembly.

The blades are connected to the platform by a method analogous to that described above. The platform 40 comprises a web 42 (FIG. 10) which differs from the web 22 of FIG. 4 in that it has two through passages 44, 44' for the ends of the blades 10, 10'.

As before, the blades 10, 10' are formed by draping fiber reinforcement plies around the cores of the blades, forming extensions which are folded down onto the inside and outside faces of the web 42 of the platform. A platform box is then made by winding fiber reinforcement plies around the web 42, passing over the flaps of the reinforcement plies of the blades.

Inserts 30 are put into place through the platform before or after the resin impregnating the reinforcement plies of the blade shells and the platform box is cured.

What is claimed is:

1. An assembly for a turbomachine, the assembly comprising at least one blade of composite material together with a platform for mounting the blade and to which one end of the blade is connected, the blade comprising fiber reinforcement plies which are draped on a blade core and which present extensions extending beyond the end of the blade and integrated in the platform, wherein the platform comprises a web having an inside face and an outside face against which reinforcement ply extensions of the blade are folded to form flaps for securing the blade to the platform, and a composite box surrounding the web and comprising reinforcement plies draped on the platform web over the flaps.

2. An assembly according to claim 1, wherein the blade end connected to the platform is engaged through a passage formed in the platform web from the inside face thereof, and the ply extensions folded down against the outside face of the platform web pass through said passage.

3. An assembly according to claim 2, wherein the platform web is made of foam.

4. An assembly according to claim 1, including inserts extending through the platform and presenting passages for fasteners for fixing the platform.

5. An assembly according to claim 1, comprising at least two blades connected to a common platform.

6. An assembly for a turbomachine, the assembly comprising at least one blade of composite material together with a platform for mounting the blade and to which one end of the blade is connected, the blade comprising fiber reinforcement plies which are draped on a blade core and which present extensions extending beyond the end of the blade and integrated in the platform, wherein the platform comprises a web made of foam and having an inside face and an outside face against which reinforcement ply extensions of the blade are folded to form flaps for securing the blade to the platform, and a composite box surrounding the web and comprising reinforcement plies draped on the platform web over the flaps.

7. An assembly according to claim 6, wherein the blade end connected to the platform is engaged through a passage formed in the platform web from the inside face thereof, and the ply extensions folded down against the outside face of the platform web pass through said passage.

8. An assembly according to claim 7, wherein the foam is rigid.

9. An assembly according to claim 6, including inserts extending through the platform and presenting passages for fasteners for fixing the platform.

10. An assembly according to claim 6, comprising at least two blades connected to a common platform.

11. A blade assembly for a turbomachine, comprising:
a blade core having a plurality of first fiber reinforcement plies draped therealong, some of said first fiber reinforcement plies extending beyond an end of said blade core so as to provide a plurality of ply extensions;

a platform web having an opening formed therethrough through which an end of said blade core and at least one said ply extension is passed, such that at least a first ply extension is disposed along a first side of said platform web and at least a second ply extension is disposed along a second side of said platform web opposite said first side;

a plurality of second fiber reinforcement plies draped around said platform web and over said first and second ply extensions extending along said platform web;

wherein said first and second fiber reinforcement plies are embedded in a cured resin so as to encase said platform web and said blade core.

12. The assembly according to claim 11, wherein said second fiber reinforcement plies are draped along a direction substantially transverse to a direction in which said first and second ply extensions extend.

13. The assembly according to claim 11, wherein said blade core is made from a rigid foam.

14. The assembly according to claim 11, wherein said platform web is made from a rigid foam.

15. The assembly according to claim 11, further comprising a hollow insert extending through said platform web and said first and second fiber reinforcement plies thereover.

16. A method of making an assembly formed by at least one composite material blade and a platform for mounting the blade in a turbomachine, in which method the blade is made by draping fiber reinforcement plies on a blade core, with at least a fraction of the plies extending beyond an end of the blade for connection to the platform so as to form ply extensions, and the ply extensions are folded down onto the platform to form flaps that provide a structural connection between the blade and the platform, wherein a part is used that constitutes a platform web, having a shape that is close to the shape of the platform with an inside face and an outside face that are opposite each other, the ply extensions are folded down against the inside face and against the outside face of the web of the platform so as to form flaps for securing the blade to the platform, and fiber reinforcement plies are draped around the web of the platform and over the flaps so as to form a platform box holding the flaps captive.

17. A method according to claim 16, wherein a fraction of the ply extensions and the end of the blade are engaged in a passage formed through the web of the platform and having a section of shape that corresponds to the end profile of the blade, these ply extensions and the blade end being engaged in the passage from the inside face of the platform web, and the ply extensions that have passed through the platform web being folded down against the outside face thereof, while other ply extensions that have not been inserted in the passage are folded down against the inside face of the platform.

18. A method according to claim 16, wherein the plies draped around the blade core and the plies draped around the platform web are impregnated in resin before or after draping, and heat treatment is performed simultaneously on all of the impregnated plies.

19. A method according to claim 16, wherein the platform web is made of a rigid foam.

20. A method according to claim 16, wherein inserts are installed through the platform, the inserts providing passages for fasteners for fixing the platform.

21. A method according to claim 16, wherein at least two blades are connected to a common platform.

22. A method of making an assembly formed by at least one composite material blade and a platform for mounting the blade in a turbomachine, in which method the blade is made by draping fiber reinforcement plies on a blade core, with at least a fraction of the plies extending beyond an end of the blade for connection to the platform so as to form ply extensions, and the ply extensions are folded down onto the platform to form flaps that provide a structural connection between the blade and the platform, wherein a part is used that constitutes a platform web made of foam, having a shape that is close to the shape of the platform with an inside face and an outside face that are opposite each other, the ply extensions are folded down against the inside face and against the outside face of the web of the platform so as to form flaps for securing the blade to the platform, and fiber reinforcement plies are draped around the web of the platform and over the flaps so as to form a platform box holding the flaps captive.

23. A method according to claim 22, wherein a fraction of the ply extensions and the end of the blade are engaged in a passage formed through the web of the platform and having a section of shape that corresponds to the end profile of the blade, these ply extensions and the blade end being engaged in the passage from the inside face of the platform web, and the ply extensions that have passed through the platform web being folded down against the outside face thereof, while other ply extensions that have not been inserted in the passage are folded down against the inside face of the platform.

24. A method according to claim 22, wherein the plies draped around the blade core and the plies draped around the platform web are impregnated in resin before or after draping, and heat treatment is performed simultaneously on all of the impregnated plies.

25. A method according to claim 22, wherein the foam is rigid.

26. A method according to claim 22, wherein inserts are installed through the platform, the inserts providing passages for fasteners for fixing the platform.

27. A method according to claim 22, wherein at least two blades are connected to a common platform.

28. A method of making a turbomachine blade assembly, comprising:

draping a plurality of first fiber reinforcement plies on a blade core, wherein at least some of the first fiber reinforcement plies extend beyond an end of the blade core so as to provide ply extensions;

passing an end of the blade core and at least some of the ply extensions through a passage formed in a platform web, so that at least one first ply extension is disposed on a first side of the platform web and at least one second ply extension is disposed on a second side of the platform web opposite the first side;

extending the at least one first ply extension along the first side of the platform web and extending the at least one second ply extension along the second side of the platform web; and draping second fiber reinforcement plies around the platform web over the at least one first ply extension and the at least one second ply extension extending along the platform web.

29. The method according to claim 28, wherein at least one of the first fiber reinforcement plies and the second fiber reinforcement plies is pre-impregnated with resin.

30. The method according to claim 28, wherein at least one of the first fiber reinforcement plies and the second fiber reinforcement plies is impregnated with resin after being draped in place.

31. The method according to claim 28, wherein the first and second fiber reinforcement plies are impregnated with resin, the method further comprising a heat treatment for curing the resin performed after draping the second fiber reinforcement plies.

32. The method according to claim 28, wherein the blade core is made from a foam.

33. The method according to claim 32, wherein the blade core is made from a rigid polyurethane foam.

34. The method according to claim 28, wherein the second fiber reinforcement plies are draped along a direction substantially transverse to the direction of extension of the at least one first ply extension and the at least one second ply extension.

35. The method according to claim 28, comprising providing a hollow insert through the platform web for receiving a fastener.

* * * * *